United States Patent [19]

Essinger et al.

[11] Patent Number: 4,939,646

[45] Date of Patent: Jul. 3, 1990

[54] METHOD FOR REPRESENTING DIGITIZED IMAGE DATA

[75] Inventors: Jacques R. Essinger, Rancho Palos Verdes; Michael L. Rhodes, Los Angeles; Dennis C. Coyle, Playa Del Rey, all of Calif.

[73] Assignee: MPDI, Inc., Torrance, Calif.

[21] Appl. No.: 192,586

[22] Filed: May 9, 1988

[51] Int. Cl.$^5$ .............................................. G06F 15/42
[52] U.S. Cl. ........................... 364/413.22; 364/413.13; 378/901
[58] Field of Search ....................... 364/413.24, 413.13, 364/413.18, 413.19, 413.22, 413.28; 382/6; 378/901

[56] References Cited

U.S. PATENT DOCUMENTS 4,703,424 10/1987 Gullberg et al. ................ 378/901
4,710,876 12/1987 Cline et al. ..................... 364/413.22

Primary Examiner—Jerry Smith
Assistant Examiner—Kim Thanh T. Bui
Attorney, Agent, or Firm—Spensley Horn Jubas & Lubitz

[57] ABSTRACT

A method for representing digitized scanned image data obtained by a non-intrusive cross-sectional image generating device. By representing an original set of user-input data points in polar coordinates, such that all of the points lie in the upper two quadrants of the coordinate system, a cubic spline algorithm can be applied once to generate a series of polynomial functions that describe a curve connecting all of the input data points. The method also uses the calculated cubic spline coefficients for the initial curve to determine intermediate data points at each of which a uniform length perpendicular is constructed. By traversing each perpendicular a desired length, new data points equidistant from the initial curve are calculated, resulting in additional curves equidistant from the initial curve. Any of the curve representations generated can then be used to select pixels from the scanned image data to display a reformatted view of the original data.

4 Claims, 6 Drawing Sheets

Step 40   FETCH $x_i, y_i$ FOR $i = 1, ..., N$
          ($N$ = no. of points entered by user)

Step 41   CALCULATE NEW AXIS CENTER $x_T, y_T$
          ($x_T = (x_1 - x_N)/2 + x_1$)
          ($y_T$ = (greater of ($y_1, y_N$)) + constant)

Step 42   TRANSLATE AND ROTATE ALL DATA POINTS TO NEW X,Y
          COORDINATES
          ($x_i' = x_i - x_T$)
          ($y_i' = y_T - y_i$)

Step 43   TRANSFORM ALL DATA POINTS INTO POLAR COORDINATES ($r_i = \sqrt{x_i^2 + y_i^2}$)
          ($\theta_i = \arccos(x_i/r_i)$)

Step 44   CALCULATE & STORE NATURAL CUBIC SPLINE COEFFICIENTS
          a, b, c, d FOR ALL PAIRS OF POLAR DATA POINTS ($S(\theta) = S_j(\theta) = a_j + b_j(\theta - \theta_j) + c_j(\theta - \theta_j)^2 + d_j(\theta - \theta_j)^3$ for
          $\theta_j \leq \theta < \theta_{j+1}$, and where $a_j = r_j$ for polar coordinates)

Step 45   CALCULATE INTERMEDIATE DATA POINTS BY VARYING $\theta$ BY
          SOME VALUE $\delta$, USING CALCULATED NATURAL CUBIC SPLINE
          COEFFICIENTS TO DETERMINE r Step 46   TRANSFORM ALL CALCULATED & ORIGINAL DATA POINTS
          FROM POLAR COORDINATES TO X,Y SCREEN COORDINATES &
          DISPLAY CURVE
          ($x_i = x_T + r_i \cdot \cos\theta_i$)
          ($y_i = y_T - r_i \cdot \sin\theta_i$)

FIG. 4

| | |
|---|---|
| Step 50 | FETCH STORED NATURAL CUBIC SPLINE COEFFICIENTS |
| Step 51 | CALCULATE INTERMEDIATE DATA POINTS BY VARYING θ BY SOME VALUE $\delta$, USING CALCULATED NATURAL CUBIC SPLINE COEFFICIENTS TO DETERMINE r |
| Step 52 | CALCULATE DERIVATIVE (I.E., SLOPE) AT EACH CALCULATED DATA POINT & CONVERT SLOPE TO SCREEN COORDINATES (screen coordinates slope = - (calculated slope)) |
| Step 53 | TRANSFORM CALCULATED DATA POINT FROM POLAR COORDINATES TO X,Y SCREEN COORDINATES<br>$(x_i = x_T + r_i \cdot \cos\theta_i)$<br>$(y_i = y_T - r_i \cdot \sin\theta_i)$ |
| Step 54 | CALCULATE SLOPE OF PERPENDICULAR AT EACH CALCULATED POINT<br>(slope of perpendicular = -1/(slope of point)) |
| Step 55 | CALCULATE X,Y DATA POINTS FOR NEW CURVES USING INTERVAL DISTANCE "l" INPUT BY USER, & STORE CALCULATED POINTS<br>$(x',y' = x + \Delta x, y + \Delta y$, where $\Delta x$ and $\Delta y$ determined by solving:<br>$\Delta y/\Delta x$ = slope of perpendicular, and $\Delta x^2 + \Delta y^2 = l^2$ ) |

*Fig. 5*

| | |
|---|---|
| Step 60 | FETCH DATA POINTS FOR ONE OF PREVIOUSLY STORED CURVES |
| Step 61 | CONVERT DATA POINTS TO INTEGER FORM |
| Step 62 | USE x,y DATA POINTS TO ADDRESS IMAGE DATA TO SELECT PIXELS FROM A "SLICE" ALONG CURVE REPRESENTED BY DATA POINTS |
| Step 63 | FILTER PIXEL DATA VALUE IF DESIRED FOR BETTER IMAGE |
| Step 64 | STORE SELECTED PIXELS IN TEMPORARY PIXEL DATA FILE |
| Step 65 | LOOP TO STEP 62 UNTIL ALL DATA POINTS HAVE BEEN APPLIED TO EACH DATA "SLICE" |
| Step 66 | DISPLAY SELECTED PIXELS IN TEMPORARY FILE AS PANORAMIC CROSS-SECTIONAL VIEW OF SCANNED STRUCTURE |

Fig. 6

METHOD FOR REPRESENTING DIGITIZED IMAGE DATA

BACKGROUND OF THE INVENTION

1. Field of the Invention

This invention relates to a method for representing digitized scanned image data, and more particularly, to a method for representing digitized data of a highly curved structure obtained by a non-intrusive cross-sectional image generating device.

2. Related Art

In a number of fields, including the field of medicine, computer-assisted tomography (CT), magnetic resonance (MR), and ultrasonic scanners have been employed to generate cross-sectional images of the interior of objects in great detail but in a non-intrusive manner. For example, a CT scanner consists of an x-ray machine and a computer. The scanner takes x-rays in thin two-dimensional cross-sectional "slices". Digitized data representing each "slice" is recorded by the computer and can be displayed on a graphics screen. One such scanner is the General Electric Model 9800 CT Scanner. A CT examination usually consists of a series of these cross-sectional views, each slice adjacent to the next (similar to slices from a loaf of bread). Similar slices can be taken by MR or ultrasonic scanning.

Such scans have been particularly useful in the medical field, where such digitized scan data has been reformatted to provide synthesized images of a scanned body structure in a plane or along a curve different from the plane of the original scanned images.

For example, the reformation of digitized data from such scans has in the past been used to recast data from an axial CT scan of a spine. After reformation, a synthesized image of the spine can be viewed from the sagittal or coronal planes of the body, thus providing an internal cross-sectional "slice" oriented as a "front view" or a "side view" x-ray of the spine.

Another reformed view of such axial scan data that has proven useful in practice is a curved coronal view or a curved sagittal view of a curved structure such as the spine. In these views, the axial data is reformed to present a synthesized image that appears to be a side or front view of the internal spinal structure along a curve that follows the curvature of the spine. In effect, the image presented is a longitudinal cross-section of the spine that follows the curvature of the spine.

In generating such cross-sectional reformed images, it is necessary to create a mathematical model of a curve that conforms to the curvature of the scanned structure. The calculated curve is mapped onto the digitized image data in order to select proper components of that data to reform into a synthesized image. Past scanning systems have typically modeled a curved structure such as the spine by a single polynomial generated by the least-squares method applied to a number of data points selected by a user from an image of the complete spine.

The prior art approach to modeling curved structures has worked sufficiently well for such anatomical structures as the spine which are not highly curved. However, it is desirable to obtain CT, MR, or ultrasonic scanned images of other structures in the body, such as the mandible or maxilla. A problem arises with both of these structures because they exhibit a high degree of curvature. The techniques used in the prior art for modeling the curvature of a body structure often cannot be effectively applied to such highly curved structures.

For example, FIG. 1 shows the outline of a typical maxilla. The prior art least-squares method for generating a polynomial that best approximates a set of user-defined data points "outlining" a desired curve is not always able to generate a polynomial that will accurately trace the curvature of a typical maxilla. This reflects the inability of a least-square algorithm to fit a single polynomial to a set of discrete data points that contain squared or non-smooth corners (for example, the maxilla typically has approximately square corners). A second problem with the prior art data representation is that the polynomial used to represent the curve must be a mathematical function, so that for each "x" data point, there is one and only one "y" data point. Therefore, the prior art cannot deal with colinear points of the type shown along line A—A' in FIG. 1.

A further problem arises with respect to generating additional reformed images. Once the scanned structure has been mathematically modeled as a line or curve, the line or curve can be applied to the scanned image data to generate synthesized views of the scanned structure.

However, the basic mathematical model only provides a single "slice" of the curve structure upon which to synthesize an image. To synthesize further images corresponding to different "slices" through the scanned structure, the basic mathematical model can be manipulated to generate a family of curves which can then be applied to the scanned data image. For example, FIG. 2a graphically shows an initial curved line 20 generated for a spine. To generate additional views of the spine along different curves, additional curves 21 (shown as dotted lines in FIG. 2a) can be created by simple translation of the initial curve. This simple translation generally produces a family of curves that are approximately equidistant. However, the curved structure to be scanned may exhibit certain characteristics that will cause this technique to fail, as shown encircled in FIG. 2b, where the simple translation of the original curve will produce a family of curves that are not equidistant at all points, but instead merge.

An approach taken to solve this problem has been to generate a series of equidistant points along the original curve, and to create equal length lines perpendicular to those points to define a new set of points equidistant from the initial curve 20 and through which a new curve 22 can be constructed. This is diagrammatically shown in FIG. 2c. However, some problems persist with this technique when applying it to highly curved structures. If equally spaced perpendicular lines are generated for local tangents, difficulties arise for areas of high curvature. For example, as shown in FIG. 2d, the points defined by the ends of each perpendicular line may become out of order on the "inside" of an area of high curvature, while "outside" an area of high curvature the ends of the perpendicular lines do not accurately follow the curvature of the original curve.

Therefore, it is desirable to generate a smooth curve overlying a scanned image of a highly curved structure so that synthesized images of the scanned structure can be generated based on the curve. It is further desirable to be able to generate a family of curves each having its points equidistant from the initial curve.

It is an object of this invention to provide a means for representing an initial curve that conforms to a highly curved scanned structure, as well as to provide a means for generating a plurality of similar curves equidistant from the initial curve.

SUMMARY OF THE INVENTION

The invention utilizes the fact that, generally, highly curved body structures that would typically be scanned by CT, MR, or ultrasonic scanners, such as the mandible or maxilla, and hence user-input data points, will at worst be "horseshoe" shaped in nature. By representing the original set of points in a polar coordinate system, with all of the points in the upper two quadrants of the coordinate system, a cubic spline algorithm can be applied once to a redefined set of points $\{r_i, \Theta_i\}$, such that $\Theta$ varies from 0 to $\pi$, and $\Theta_1 < \Theta_2 < \Theta_3 \ldots < \Theta_n$, thereby generating a series of functions that best approximates the desired curve. A simple conversion is needed to generate screen coordinates for selecting pixel values to display.

The present invention also provides for a means of generating additional curves equidistant from the original curve to be used in generating additional views of the scanned structure. The calculation of additional curves equidistant from the initial curve also makes use of the polar coordinate data representation of the cubic spline coefficients, resulting in a substantial reduction in computation necessary to generate such additional curves. The inventive method uses the previously calculated cubic spline coefficients for the initial curve to determine intermediate data points at each of which a uniform length perpendicular is constructed. By traversing each perpendicular a desired length, new data points equidistant from the initial curve can be calculated. Each set of new data points comprises an additional curve, as desired.

Any of the curve representations generated as described above can be used to select pixels from the scanned image data to display a reformed view of the original data.

These and other features, advantages, and details of the preferred embodiment of the present invention are set forth below. Once the concepts behind the invention are known, numerous additional innovations and changes will become obvious to one skilled in the art.

DESCRIPTION OF THE DRAWINGS

The invention will become better understood by reference to the following detailed description when taken in conjunction with the accompanying drawings showing the preferred embodiment of the invention.

FIG. 4 is a flow chart of the Initial Curve Generation Procedure of the present invention.

FIG. 5 is a flow chart of the Equidistant Curve Generation Procedure of the present invention.

FIG. 6 is a flow chart of the Pixel Selection And Display Procedure of the present invention.

Like numbers and designations in the drawings refer to like elements.

DETAILED DESCRIPTION OF THE INVENTION

The inventive method can be implemented as a series of steps performed by a general purpose digital computer such as is found in many scanning instruments. The general requirements of such a computer are that it have data storage means (such as semiconductor or core memory, or a magnetic media storage device), input/output means for storing data to or fetching data from the data storage means, a processor means for manipulating data, and a display means for visually displaying selected data.

Figure 1:
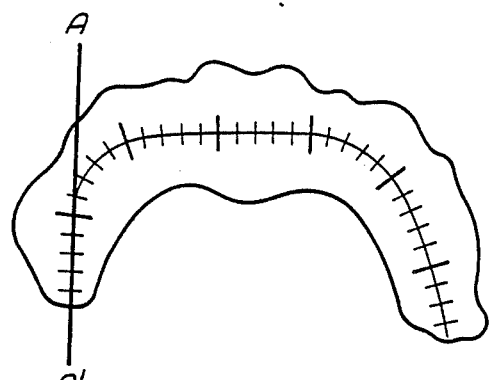
FIG. 1 is an outline view of a scanned image of a maxilla, showing co-linearity of data points along line A—A'.
Figure 3:
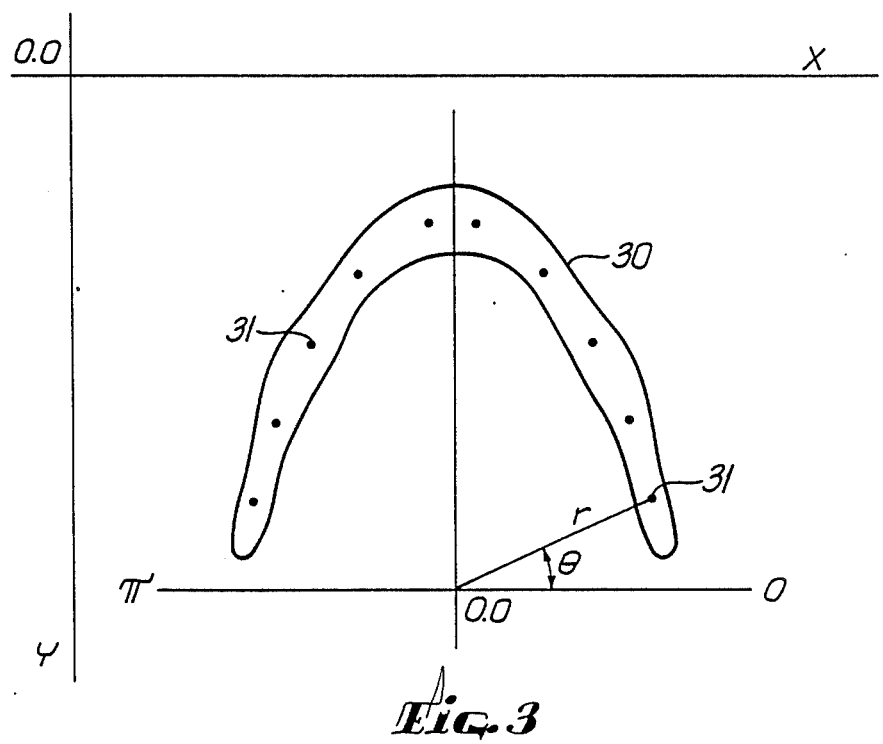
FIG. 3 is an outline view of a scanned image of a mandible, shown on a display screen.

In order to generate a curve through a scan of a highly curved structure, such as the mandible or maxilla, a normal scan is performed on the curved structure. For example, 30 to 40 axial "slices" of image data may be taken of a maxilla. Using the features of available scanning machines, a user selects one of the image slices (typically a slice from near the middle of the group of slices) for display on the scanner's display system. For example, FIG. 3 shows a sketch of a typical scanner display, having an Cartesian x,y coordinate system with the origin in the upper left-hand corner. Shown in outline form as being displayed is the image data obtained from scanning a maxilla 30.

Using the features available on a commercial scanner, a user may select a number of points 31 (for example, 5 to 10 points) by means of a light pen, mouse, or similar pointing device, that correspond to points on the displayed curved structure. These points represent the outline of a curve which the user desires to serve as an initial curve in reforming the scanned image data into alternative views.

In order to obtain such alternative views, the discrete points must preferably be connected by a curve. Rather than using a least-squares algorithm to generate a polynomial representing a best-fit curve to data points selected by a user from a scanned image, the inventive method utilizes a cubic spline algorithm. By use of a cubic spline algorithm, the sinole polynomial used in the least-squares algorithm to represent the discrete set of user-defined points is replaced by a set of cubic polynomials. Straightforward use of a cubic spline algorithm, however, results in a problem similar to the least-squares algorithm with respect to co-linear points. The standard solution for this problem in the past has been to parameterize the original set of (x,y) points into two new sets of points (x,L) and (y,L), where "L" is an approximation of the length of the line. A cubic spline algorithm to generate curves for both sets of points is then used. Although this approach solves the problem of adequately representing the curve defined by the data points selected by a user, it adds significantly to the computation time in processing the image data (approximately doubling this portion of the computation time, since the computation-intensive cubic spline algorithm must be applied twice).

Consequently, the invention utilizes the fact that, generally, highly curved body structures that would typically be scanned by CT, MR, or ultasonic scanners, such as the mandible or maxilla, and hence the user-typically input data points, will at worst be "horseshoe" shaped in nature. It was recognized that by representing the original set of points in a polar coordinate system, with all of the points in the upper two quadrants of the coordinate system, a cubic spline algorithm can be applied once to a redefined set of points $\{r_i, \Theta_i\}$, such that $\Theta$ varies from 0 to $\pi$, and $\Theta_1<\Theta_2<\Theta_3...<\Theta_n$. A simple conversion is needed to generate screen coordinates for selecting pixel values to display.

The present invention provides for a means of generating such a curve by transforming the input data points into a polar coordinate system and applying a cubic spline algorithm to generate a series of functions that describe the desired curve.

FIG. 4 is a high-level flow chart of a preferred procedure for generating a cubic spline curve through the user-selected data points. It should be understood that the basic procedures can be implemented in different ways. For example, all data points can be operated on at each step where feasible, or alternatively single data points or pairs of data points can be operated on iteratively through a number of operations to accomplish the same purpose.

The data points are initially represented by individual "x,y" Cartesian coordinates relative to the scanner's screen display (noted above as having its origin in the upper left-hand corner). An aspect to overcoming some of the problems of the prior art with respect to generating a curve connecting user-input data points is the transformation of the x,y coordinates of each data point into polar coordinates.

Referring to FIG. 4, the first step is to read each data point $x_i, y_i$ of the points input by the user (Step 40). Next, a new origin having coordinates $x_T, y_T$ is calculated such that the new coordinate system has its y-axis approximately centered on the curved structure, and its x-axis (and thus the new coordinate system origin) "below" the "open" part of the curved structure image, as shown diagrammatically in FIG. 3 (Step 41).

Thereafter, each of the data points is translated and rotated to the new coordinate system (Step 42), and each of the data points is converted to polar coordinates to generate a set of points $\{r_i, \Theta_i\}$, such that $\Theta$ varies from 0 to $\pi$, and $\Theta_1<\Theta_2<\Theta_3...<\Theta_n$ (Step 43). As noted previously, the recognition that the user-input data points outlining such highly curved structures can be representing in polar coordinates not only obviates the co-linearity problem of simple polynomial curve-fitting algorithms, it substantial reduces the calculation time required to fit a curve to the data points using a cubic spline algorithm.

Next, a natural cubic spline algorithm is applied to the polar coordinate data points (Step 44). The following sets forth one procedure for calculating the natural cubic spline function for N user-selected data points. Since, however, polar coordinates are used, each "x" term is replaced by a corresponding "$\Theta$" term.

1. For $i=0, ..., N-1$ set $h_i = x_{i+1} - x_i$
2. For $i=1, ..., N-1$ set
$\alpha_i = 3[a_{i+1}h_{i-1} - a_i(x_{i+1} - x_{i-1}) + a_{i-1}h_i]/ h_{i-1}h_i$
3. Set $L_0 = 1$
$\mu_0 = 0$
$z_0 = 0$
4. For $i=1, ..., N-1$
set $L_i = 2(x_{i+1} - x_{i-1}) - h_{i-1}\mu_{i-1}$
$\mu_i = h_i/L_i$
$z_i = (\alpha_i - h_{i-1}z_{i-1})/L_i$
5. Set $L_N = 1$
$z_N = 0$
$c_N = z_N$
6. For $j = N-1, ..., 0$
set $c_j = z_j - \mu_j c_{j+1}$
$b_j = (a_{j+1} - a_j)/h_j - h_j(c_{j+1} + 2c_j)/3$
$d_j = (c_{j+1} - c_j)/3h_j$ The computer implementation of this algorithm is straightforward and well-known, and can be directly implemented essentially as set forth above. The result of this procedure is a set of coefficients $\{a_i, b_i, c_i, d_i\}$ which can be applied to the cubic spline interpolant described in Step 44 to generate a smooth curve that passes through all of the user-defined data points. (It should be noted that the prior art least-squares method did not insure that the calculated curve would pass through the user-input data points).

Thereafter, to calculate the coordinates of intermediate data points that can be displayed to the user as a curve connecting all of the input data points, the calculated cubic spline coefficients are applied to the cubic spline interpolant ($S(\Theta)$, shown in Step 44) for each segment between input data points (Step 45). For example, starting with one of the two end-points input by the user, $\Theta$ can be varied by repetitively adding to it some small amount $\delta$ (arbitrarily chosen to obtain adequate resolution without over-calculating intermediate data points) to calculate new values of $S(\Theta)$ (that is, a new value of $r_j$ for each input $\Theta + (\delta \cdot j)$, where j is the iteration number). The resulting intermediate data points $r_j, \Theta_j$ are then transformed into screen coordinates and sent to the computer system's display system (Step 46), where the calculated intermediate data points and original input data points are displayed as a smooth curve overlying a scanned data image.

The calculation of additional curves equidistant from the initial curve also makes use of the polar coordinate data representation of the initial curve model, resulting in a substantial reduction in computation necessary to generate such additional curves. Basically, the inventive method uses the previously calculated cubic spline coefficients for the initial curve to determine intermediate data points at which a uniform length perpendicular is constructed. By traversing the perpendicular a desired length, new data points equidistant from the initial curve can be calculated. Each set of new data points directly comprises an additional curve, as desired, without having to apply a curve-fitting algorithm. FIG. 5 sets forth a high-level flow chart of a preferred procedure for generating such additional curves.

First, the cubic spline coefficients previously calculated for the initial curve are retrieved (Step 50), and used to calculate intermediate data points by repetitively adding to an initial $\Theta$ some small amount $\delta$ (arbitrarily chosen to obtain adequate resolution without over-calculating intermediate data points) to calculate new values of $S(\Theta)$ (that is, a new value of $r_j$ for each input $\Theta + (\delta \cdot j)$, where j is the iteration number) (Step 51). The derivative, or slope, at each such data point is then calculated (Step 52). The use of a cubic spline representation and polar coordinates aids in calculating the desired derivatives because an exact value of the derivative at each point can be determined.

The following sets forth one procedure for calculating the derivative for the calculated data points:
1. Slope $= dy/dx = dy/d\Theta \cdot d\Theta/dx$
2. Since $y = r \cdot \sin\Theta$ and $x = r \cdot \cos\Theta$,
2.1 $dy/d\Theta = dr/d\Theta \cdot \sin\Theta + r \cdot \cos\Theta$
2.2 $d\Theta/dx = 1/(dx/d\Theta) = 1/(dr/d\Theta \cdot \cos\Theta - r \cdot \sin\Theta)$
3. $dr_i/d\Theta =$ derivative of cubic spline function $S(\Theta) = b_i + 2c_i(\Theta - \Theta_i) + 3d_i(\Theta - \Theta_i)^2$
4. Using the derivative of $S(\Theta)$ from step 3 in the identities of step 2 gives the value of the two factors in step 1, from which the slope is calculated.

Figure 2A:
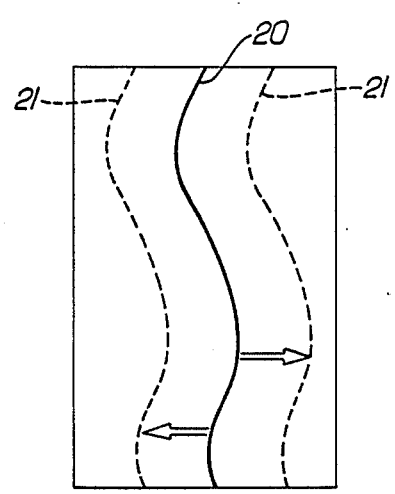
FIGS. 2a-2d are schematic examples of problems in the prior art of conforming a generated curve to a curved scanned structure.
Figure 2B:
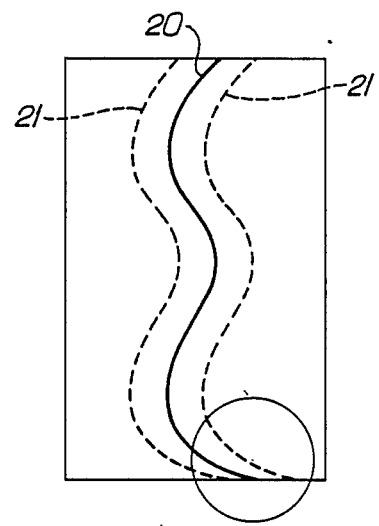
Figure 2C:
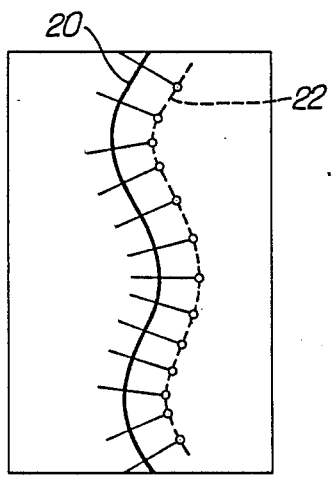
Figure 2D:
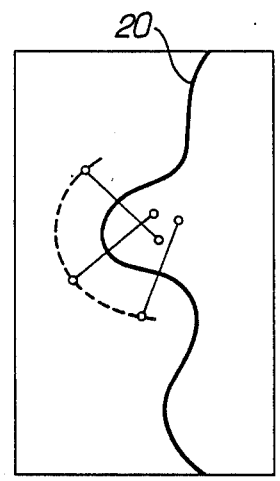

It should be noted that because a constant angle δ was used to determine the location of the intermediate data points along the initial curve, such data points are not necessarily equally space along the curve. Rather, the spacing is related to the local curvature of the curve, which helps obviate the problem describe above with respect to FIG. 2d.

After calculating the slope at each calculated intermediate data point, each intermediate data point is converted into x,y screen coordinates (Step 53), and a perpendicular line is generated at each such point by calculating the negative inverse slope at each point (Step 54). Using this calculated slope for the perpendicular, and the coordinates of the calculated data points along the initial curve, new data points representing the desired additional curves are generated by traversing along each perpendicular a set interval distance (input by the user) on either side of the initial curve (Step 55). The new curve coordinates are stored for latter use (Step 55).

An advantage of the inventive procedure is that a family of inner and outer curves can be generated while only having to calculate the slope of the initial curve once at each intermediate data point.

Finally, FIG. 6 sets forth a high-level flow chart of a procedure for using one of the curve representations generated as described above to select pixels from the scanned image data to display a reformed view of the original data. As one example only, FIG. 6 describes the selection of pixels from a plurality of scan "slices" to generate what is known in the dental field as a "panorex" view—that is, a cross-sectional view along the curvature of a scanned structure, commonly used in oral radiography.

The data points for the initial or one of the additional curves are retrieved (Step 60) and converted from real to integer form (Step 61) in order to address and select the pixel values of a scanned data image (Step 62). If desired, each selected pixel value can be filtered (for example, by averaging a pixel value with some number of the surrounding pixel values) to enhance the image quality (Step 63).

The selected pixel values are temporarily stored (Step 64), and the process is repeated for pixel data in each image "slice" (Step 65). The temporary file of pixel data ultimately represents the desired cross-sectional view, and the pixel data can be sent to a display for viewing (Step 66). In practice, some interpolation may be desired to generate intermediate rows of pixel data to compensate for the discrete stepping difference between scanned image "slices". Such an interpolation procedure is described in the co-pending patent application entitled "Method For Generating Oblique Synthesized Images" (Serial No. 07 193331).

While a particular embodiment of the invention is described above, it should be understood that changes can be made without departing from the spirit or scope of the invention. For example, the order of some of the processing steps shown in the flow chart figures can be rearranged such that the same functions are accomplished without departing from the essence of the inventive method. Therefore, this invention is not to be limited to the specific embodiment discussed and illustrated herein, but rather by the following claims.

We claim:

1. A method for determining and displaying the coordinates of a curve passing through a set of initial Cartesian coordinate data points, comprising the steps of:

(a) generating a two-dimensional field of image data by a non-intrusive cross-sectional image generating device;
   (b) selecting a set of initial data points represented in Cartesian coordinates from the image data;
   (c) converting the initial data points from Cartesian coordinates to polar coordinates such that all of the points lie in the upper quadrants of the polar coordinate system;
   (d) determining a set of cubic spline polynomials describing a curve passing through each of the converted initial data points;
   (e) calculating the polar coordinates of intermediate data points between the converted initial data points at a selectable resolution using the determined set of cubic spline polynomials;
   (f) converting the calculated intermediate data points from polar coordinates to Cartesian coordinates; and
   (g) displaying the converted intermediate data points and the initial data points on a display means as an apparent approximately continuous curve passing through the set of initial data points.

2. A method for determining and displaying the coordinates of an initial curve passing through a set of initial Cartesian coordinate data points, and for determining the coordinates of at leas tone additional curve equidistant from the initial curve, comprising the steps of:

(a) generating a two-dimensional field of image data by a non-intrusive cross-sectional image generating device;
   (b) selecting a set of initial data points represented in Cartesian coordinates from the image data;
   (c) converting the initial data points from Cartesian coordinates to polar coordinates such that all of the points lie in the upper quadrants of the polar coordinate system;
   (d) determining a set of cubic spline polynomials describing an initial curve passing through each of the converted initial data points;
   (e) calculating the polar coordinates of intermediate data points between the converted initial data points at a selectable resolution using the determined set of cubic spline polynomials;
   (e) calculating the slope of a perpendicular at selected ones of the calculated intermediate points;
   (g) at each of the selected ones of the calculated intermediate points, determining and storing the coordinates of additional data points a preset distance along a line having the calculated perpendicular slope, the additional data points defining at least one curve equidistant from the initial curve;
   (h) converting the calculated intermediate data points from polar coordinates to Cartesian coordinates;
   (i) displaying at least the converted intermediate data points and the initial data points on a display means as an apparent approximately continuous initial curve passing through the set of initial data points.

3. A method for selecting and displaying image data corresponding to the intersection of (1) the coordinates of a curve passing through a set of initial Cartesian coordinate data points input by a user, with (2) image data produced in a two-dimensional field by a non-intrusive cross-sectional image generating device, comprising the steps of:

(a) generating at least one set of image data representing a two-dimensional field generated by a non-intrusive cross-sectional image generating device;

(b) selecting a set of initial data points represented in Cartesian coordinates from at least one set of the image data;
(c) converting the initial data points from Cartesian coordinates to polar coordinates such that all of the points lie in the upper quadrants of the polar coordinate system;
(d) determining a set of cubic spline polynomials describing a curve passing through each of the converted initial data points;
(e) calculating the polar coordinates of intermediate data points between the converted initial data points at a selectable resolution using the determined set of cubic spline polynomials;
(f) converting the calculated intermediate data points from polar coordinates to Cartesian coordinates;
(g) addressing at leas tone of the sets of image data by selected ones of the calculated intermediate data points and initial data points;
(h) selecting the image data at each such address; and
(i) displaying the selected image data on a display means as an apparent cross-sectional image.

4. A method for selecting and displaying image data corresponding to the intersection of (1) the coordinates of a curve equidistant to a set of initial Cartesian coordinate data points input by a user, with (2) image data produced in a two-dimensional field by a non-intrusive cross-sectional image generating device, comprising the steps of:
(a) generating at least one set of image data representing a two-dimensional field generated by a non-intrusive cross-sectional image generating device;
(b) selecting a set of initial data points represented in Cartesian coordinates from at least one set of the image data;
(c) converting the initial data points from Cartesian coordinates to polar coordinates such that all of the points lie in the upper quadrants of the polar coordinate system;
(d) determining a set of cubic spline polynomials describing an initial curve passing through each of the converted initial data points;
(e) calculating the polar coordinates of intermediate data points between the converted initial data points at a selectable resolution using the determined set of cubic spline polynomials;
(f) calculating the slope of a perpendicular at selected ones of the calculated intermediate points;
(g) at each of the selected ones of the calculated intermediate points, determining the coordinates of additional data points a preset distance along a line having the calculated perpendicular slope, the additional data points defining at least one curve equidistant from the initial curve;
(h) converting the determined additional data points defining at least one such equidistant curve from polar coordinates to Cartesian coordinates;
(i) addressing at least one of the sets of image data by selected ones of the converted additional data points;
(j) selecting the image data at each such address; and
(k) displaying the selected image data on a display means as an apparent cross-sectional image.

* * * * *